United States Patent [19]

Ito et al.

[11] 4,449,916
[45] May 22, 1984

[54] DEVICE FOR MANUFACTURING INFORMATION RECORDING MEDIUMS

[75] Inventors: Keisuke Ito, Kashiwara; Toshiaki Kashihara, Hirakata; Yoshihiro Okino, Uji, all of Japan

[73] Assignee: Matsushita Electric Industrial Co., Ltd., Kadoma, Japan

[21] Appl. No.: 321,562

[22] Filed: Nov. 16, 1981

[30] Foreign Application Priority Data

Nov. 20, 1980 [JP] Japan .................... 55-163893
Apr. 1, 1981 [JP] Japan .................... 56-49862

[51] Int. Cl.³ .......................................... B28B 17/00
[52] U.S. Cl. .................................. 425/174.4; 264/107; 425/116; 425/575; 425/810
[58] Field of Search ............... 425/116, 174.4, 575, 425/576, 810; 264/107

[56] References Cited

U.S. PATENT DOCUMENTS

| | | | |
|---|---|---|---|
| 2,491,068 | 12/1949 | Adams | 425/810 |
| 3,528,127 | 9/1970 | Damm et al. | 425/116 |
| 3,635,622 | 1/1972 | Wechsler | 425/810 |
| 3,702,749 | 11/1972 | Flushfeder et al. | 425/810 |
| 3,833,328 | 9/1974 | Palmer et al. | 425/810 |
| 3,862,815 | 1/1975 | Roczynski et al. | 425/116 |
| 4,005,965 | 1/1977 | Roczynski et al. | 425/116 |
| 4,038,009 | 7/1977 | Toull | 425/116 |
| 4,112,030 | 9/1978 | Kremzow | 264/25 |
| 4,301,099 | 11/1981 | Broeksema et al. | 264/107 |
| 4,312,823 | 1/1982 | Kraakman et al. | 425/174.4 |
| 4,342,714 | 8/1982 | Gregg et al. | 425/810 |

FOREIGN PATENT DOCUMENTS

| | | |
|---|---|---|
| 53-116105 | of 1978 | Japan . |
| 53-33244 | 9/1978 | Japan . |
| 54-165358 | of 1979 | Japan . |
| 56-86722 | 7/1981 | Japan . |

Primary Examiner—Donald E. Czaja
Assistant Examiner—W. Thompson
Attorney, Agent, or Firm—Stevens, Davis, Miller & Mosher

[57] ABSTRACT

Provided is an information recording medium manufacturing device of the type in which a radiation curable layer-forming liquid resin is injected into a gap between a planar stamper carrying an information recording signal pattern to be transcribed and a planar flexible carrier member having at least one signal pattern carrying surface through means, for injecting the liquid resin, then the liquid resin is uniformly developed all over the surface of the carrier member by pressing a holding plate against the carrier member, and is set by irradiating radiant rays so as to form a transfer layer, thereby to obtain an information recording medium by separating from the stamper the carrier member united with the transfer layer. According to the present invention, the information recording medium manufacturing device further comprises means for shifting the stamper from a carrier member mounting section, sequentially through a radiation curable liquid resin injecting and pressing section and a radiant ray irradiating section, to a carrier member separating section, and then returning the same to the carrier member separating section.

7 Claims, 21 Drawing Figures

DEVICE FOR MANUFACTURING INFORMATION RECORDING MEDIUMS

BACKGROUND OF THE INVENTION

The present invention relates to a device for manufacturing information recording mediums and more particularly to a device for manufacturing planar information recording mediums each having a transfer layer made of radiation curable layer-forming liquid resin coated over a flexible carrier member, to which a signal pattern is transcribed from a planar stamper carrying a corresponding information recording signal pattern.

It is well-known to use compression molding methods or injection molding methods for manufacturing information recording mediums, such as for example, audio-recording discs and video-recording discs. In these methods, a thermoplastic resin material, such as for example, polyvinyl chloride, is heated above its melting point and then cooled for setting an information recording medium. However, these methods offer disadvantages in that polyvinyl chloride, if it is used, is liable to be decomposed and generate a chlorine gas which corrodes a stamper having a signal pattern to be transcribed, when the material is heated above its melting point. In order to eliminate these disadvantages, a heavy investment is necessary for production facilities. Further, these methods also offer problems of noise, vibration and air pollution.

It is also well-known as the other methods of manufacturing information recording mediums to transcribe a signal pattern from a stamper to a layer made of thermoradiation or radiation curable resin. The method using the thermoradiation curable resin is time-consuming to set the resin itself and requires a heat source of large capacity. On the contrary, the method using the radiation curable resin is suitable to manufacture information recording mediums, since a relatively simple manufacturing device and a time saving procedure in comparison with the other conventional methods can be utilized. Japanese Patent Laid-Open Publication No. 33244/78 discloses a method of manufacturing information recording mediums by using radiation curable layer-forming liquid resin, wherein the liquid resin is uniformly applied over a stamper, then bound to a carrier member which is pressed by a holding plate, and finally set through irradiation of radiant rays. Further, Japanese Patent Laid-Open Publication No. 116105/78 discloses a method of manufacturing information recording mediums, wherein the liquid resin is dropped onto a stamper and then pressingly applied with a carrier member which is deformed into a shape having a convex sherical surface. Further, this Laid-Open Publication also discloses another method in which the layer made of the liquid resin is formed by pressing the carrier member onto the stamper through a roller. However, the methods proposed in the both publications are not complete and satisfactory procedures for manufacturing information recording mediums having high frequency recording signals, such as for example, video-recording discs, since air bubbles are liable to be mixed into the liquid resin applied over the carrier member, when the liquid resin is dropped onto the stamper and when the carrier member is pressed to the liquid resin on the stamper. Such air bubles mixed in the liquid resin pose a serious defect in the manufacturing of information recording mediums carrying high frequency recording signals, such as for example video-discs, since dropouts of the audio-sound or in the video-image to be reproduce are caused thereby. Further, the above-mentioned method is still relatively time-consuming, even though it is effective in the manufacturing of information recording mediums than other methods, and moreover cannot be expected to attain a sufficiently high productivity.

SUMMARY OF THE INVENTION

Accordingly, the present invention provides a device for manufacturing information recording mediums, wherein a radiation curable liquid resin is injected into a space defined between a stamper and a carrier member having a center hole fitted onto a center nozzle shaft through which the liquid resin is introduced, the device further comprising means for effectively shifting one or more stampers, thereby to manufacture information recording mediums of high quality on a mass production basis, each comprising a transfer layer having a transferred signal pattern precisely concentric with the center hole of the carrier member and ensuring that none suffer from dropouts of recording signal due to air bubbles mixed into the transfer layer.

BRIEF DESCRIPTION OF THE PREFERRED EMBODIMENTS

Various other objects, features and attendant advantages of the present invention will be more fully apparent from the following detailed description when considered in connection with the accompanying drawings, wherein:

FIGS. 14b through 14d are elevational views respectively illustrating different working steps of the embodiment shown in FIG. 14a;

FIGS. 15b through 15d are elevational views respectively illustrating different working steps of the embodiment shown in FIG. 15a.

DETAILED DESCRIPTION OF THE PREFERRED EMBODIMENTS

Referring now to the drawings, like numerals represent like elements throughout the several views.

At first, a recording medium manufacturing device related to the present invention will be explained with reference to FIGS. 1 through 4 wherein reference numeral 8 denotes a planar information record stamper fixed to a mold base 9 by an injection nozzle housing 1 which slidably receives a center nozzle shaft 4 having a center hole 4d extending along the center axis thereof, a flange portion 4c provided in its free end and a plurality of injection ports 4b disposed under the flange portion 4c and opened in the radial direction of the stamper 8. The center nozzle shaft 4 is connected through a pipe 6 to an external device not shown which can intermittently feed a liquid resin under pressure in a predetermined amount. Further, the center nozzle shaft 4 includes a shaft head portion 4a onto which the center aperture of a flexible carrier member 10 is fitted. Due to the provision of the flange portion 4c, the carrier member can be held in a spaced relation to the stamper 8, leaving a gap h therebetween. The center nozzle shaft 4 is attached to an air cylinder (not shown) through a coupling member 7 so as to be vertically movable. Reference numeral 3 denotes an "O" ring disposed between slide portions of the center nozzle shaft 4 and the injection nozzle housing 1, and 11 denotes a holding plate made of flat plate, which is attached to an air cylinder 16 so as to be vertically movable. Further, reference numeral 14 denotes a radiant ray source.

Figure 4:
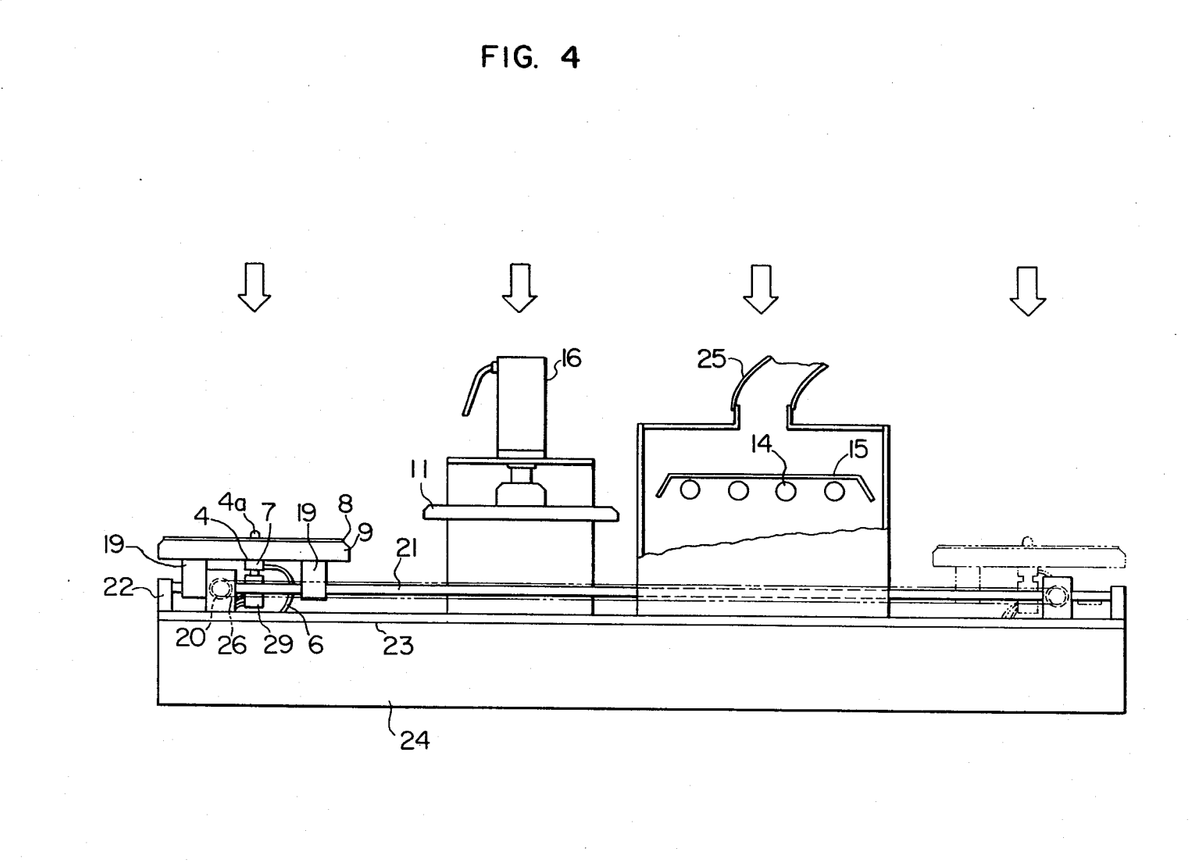
FIG. 4 is a plan view illustrating one embodiment of the present invention.

As clearly understood from FIG. 4, the mold base 9 carrying the stamper 8 is supported on slide shafts 21 by means of linear bearings 19 which are slidable along the slide shafts 21. Therefore, the mold base 9 can be also moved along the slide shaft 21 by an external drive motor (not shown) through a drive chain belt 26.

Figure 1:
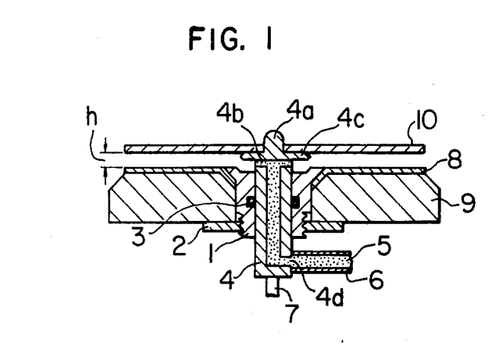
FIG. 1 is a sectional view of an injection molding section of a recording medium manufacturing device.
Figure 2:
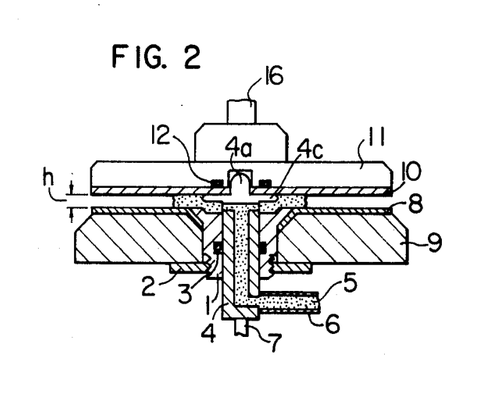
FIG. 2 is the same sectional view as shown in FIG. 1, however, it illustrates a state of injecting a radiation curable liquid resin.
Figure 3:
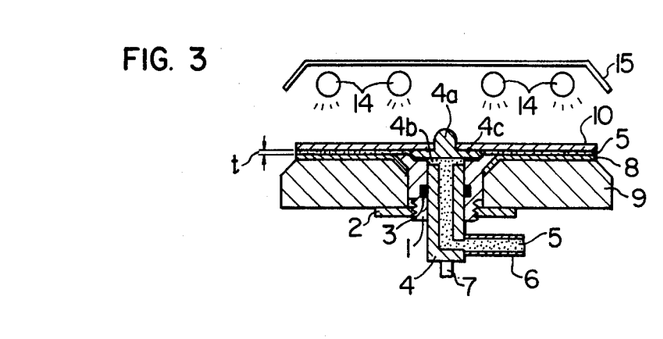
FIG. 3 is a sectional view of an irradiation section of the recording medium manufacturing device.

Next, explanation will be made to an operation of the above-mentioned record manufacturing device. Referring to FIG. 1, the carrier member 10 is fitted at its center hole onto the shaft head portion 4a of the center nozzle shaft 4 which is raised by the air cylinder (not shown) so as to leave a predetermined gap h (about 1 to 2 mm) between the stamper 8 and the carrier member 10. Therefore, the carrier member 10 is prevented from coming in touch with the stamper 8 when it is finally held on the flange portion 4c. The carrier member mounting step is thus completed. In this state, due to the arrangement of the center nozzle shaft 4 and the injection nozzle housing 1 the center aperture of the carrier member 10 can be positioned concentrically with a signal pattern carried on the stamper 8. Next referring to FIG. 2, the holding plate 11 is lowered until a protruded portion of an "O" ring 12 carried by the holding plate 11 is resiliently deformed by contacting to the carrier member 10. This "O" ring 12 is positioned opposite to the flange portion 4c of the center nozzle shaft 4 so that the carrier member 10 is pressed on the flange portion 4c when the holding plate 11 is lowered. While the holding plate 11 is statically held, a predetermined amount of a radiation curable liquid resin is injected into the gap h between the carrier plate 10 and the stamper 8 through the center nozzle shaft 4 from the external injection feeding device. As mentioned above, the "O" ring 12 carried by the holding plate 11 presses the carrier member 10 against the flange portion 4c, therefore, the liquid resin injected into the gap h is prevented from penetrating between the flange portion 4c and the carrier member 10, and between the shaft head portion 4a and the carrier member 10. When the injection is completed, the holding plate 11 is further lowered so as to press the carrier member 10 which in turn lowers the center nozzle shaft 4. Thus, the liquid resin injected between the carrier plate 10 and the stamper 8 is uniformly developed so as to form a layer having a uniform film-thickness (about 100 $\mu$). In order to regulate the resin layer between the carrier member 10 and the stamper 8 in a predetermined film-thickness and in order to prevent the liquid resin from penetrating between the carrier member 10 and the shaft head portion 4a, the flange portion 4c of the center nozzle shaft 4 is so constructed that the top surface of the flange portion 4c steppedly rises from the stamper 8 at a height of t as shown in FIG. 3. Thus, the steps of the injection and the pressurized application of the resin are completed. Next referring to FIG. 3, after the pressing by the holding plate 11 and after the resin layer having the uniform thickness has been formed, the holding plate 11 is raised upwardly, and then radiant rays are irradiated from a radiation source on the side of the carrier plate 10 so as to set the resin layer, thereby the step of the radiation cure is completed. Then the resin layer to which a signal pattern is transcribed from the stamper 8 is integrally bound with the carrier member 10 and then separated from the carrier member 10 so that an information recording medium is obtained.

FIG. 4 shows one embodied form of a device for manufacturing information recording mediums according to the present invention. In this device, the manufacture of the information recording medium is efficiently performed. In the device as shown in FIG. 4, four working sections: a carrier member mounting section A, a liquid resin injecting section B, a radiant ray irradiating section C and a recording medium separating section D, are provided on a platform 23. The molding base 9 carrying the stamper 8 is supported by the linear bearings 19 which are slidable on the slide shafts 21, so as to be shifted from the section A through the section D. Explanation will be made of an operation of the device as shown in FIG. 4. In the section A the working step explained with reference to FIG. 1 is performed. Then, the stamper 8 mounted with the carrier member 10 is shifted to the section B where a locating device is provided to stop the mold base 9 in order to locate the center of the stamper 8 in a predetermined position, precisely. In the section B, the stamper 8 located in the predetermined position is subjected to the working steps of the liquid resin injection and the pressurized application as shown in FIG. 2. After the resin layer having a uniform film thickness has been formed between the carrier member 10 and the stamper 8, the holding plate 11 is raised so as to allow the stamper 8 on the mold base 9 to move to the section C. In the section C, the stamper 8 is shifted, intermittently or continuously, so as to be irradiated by the radiant rays in a predetermined brightness and in a predetermined irradiating time. It is necessary to construct the radiant ray source 14 and a housing 15 so as to be rotatable or reciprocatable in order to uniformly irradiate the radiant rays to the resin layer on the stamper 8 through the carrier member 10 when the stamper 8 passes through the section C. The radiant ray source includes a plurality of ultraviolet ray sources of a low outlet power (20 W) and one or two ultraviolet ray sources of a high outlet power (1 KW). The travelling speed of the stamper and the distance between the radiant ray source and the carrier member (made of vinyl chrolide, acryl or the like) are suitably selected so as to prevent the carrier member from being deformed. Reference numeral 25 denotes an exhaust duct. When the transfer layer and the carrier member are separated in the final section D from the stamper which has passed the section C, one cycle of recording medium manufacturing procedure is completed. Then the stamper is shifted to the original position in the section A so as to start the next manufacturing procedure.

Figure 5:
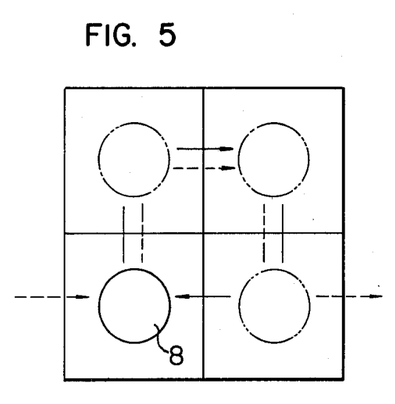
FIGS. 5 through 9 are plan views illustrating the other embodiments of the present invention.
Figure 6:
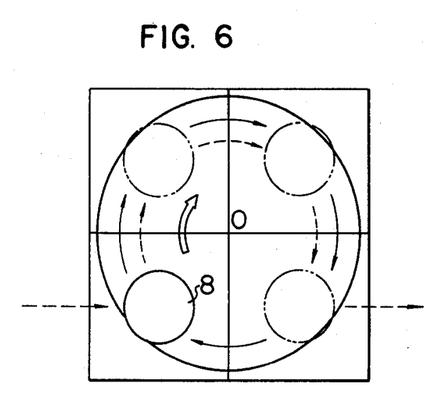

In the manufacturing device shown in FIG. 4, the information recording medium is separated from the stamper in the section D. However, the stamper shifting step can be partly omitted and therefore the size of the manufacturing device can be also decreased, if the section D is eliminated and the working step of the section D is performed in the section A to which the stamper is sent back from the section C. FIGS. 5 and 6 show recording medium manufacturing devices in which the reciprocating shifting step is omitted. Referring to FIG. 5, the carrier member is fed in the direction of an arrow a (indicated by a dotted line) and is mounted on the stamper in the section A. The stamper cycles in the direction of an arrow indicated by a solid line. In this cycle, the recording medium is separated in the section D and taken out in the direction of an arrow indicated by a dotted line, while the stamper is shifted to the original position in the section A from the section D. Due to the above arrangement, the recording medium manufacturing procedure can be readily restarted to perform the subsequent recording medium manufacturing procedure. The stamper can be cyclically moved on curved slide shafts or rails, or through steel roller balls.

In the device shown in FIG. 6, the slide shafts or rails as shown in FIG. 5 are eliminated, and, instead, a turn table 27 is used, on which the stamper is carried so as to travel the sections A through D and then to the section A, when the turn table 27 is rotated, in a circle having a center 0 as its rotating center.

Figure 7:
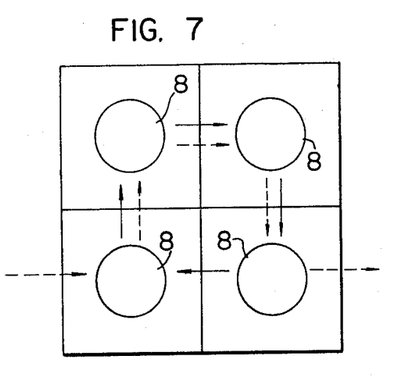
Figure 8:
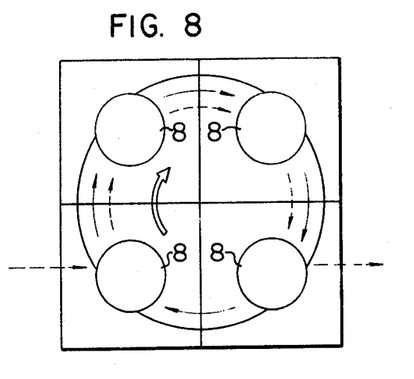

FIGS. 7 and 8 illustrate variations of the device shown in FIGS. 5 and 6, respectively, in order to improve the working efficiency of the recording medium manufacturing procedure. In the devices sections A through D are respectively provided with stampers just above the travelling path of them. These stampers are syncronizedly shifted. Due to this arrangement, working time can be lessened. The working time T which is necessary to manufacture one recording medium using the devices shown in FIGS. 5 and 6, is determined by the following equation:

$$T = T_A + T_B + T_C + T_D + \text{(stamper shifting time)}$$

Where $T_A$, $T_B$, $T_C$ and $T_D$ are working times in the sections A, B, C, and D, respectively. On the contrary, the working time T' with using the device shown in FIGS. 7 and 8, is determined by the following equation:

$$T' = \text{MAX}(T_A, T_B, T_C, T_D) + \text{(stamper shifting time)}/4.$$

In comparison with the working times T, the working time T' with using the devices shown in FIGS. 7 and 8 can be greatly decreased. Further, if the stampers of the recording medium manufacturing device as shown in FIG. 7 or 8, are partly or whole different kinds having different signal patterns, the various kinds of recording mediums can be manufactured through only one recording medium manufacturing device.

Figure 9:
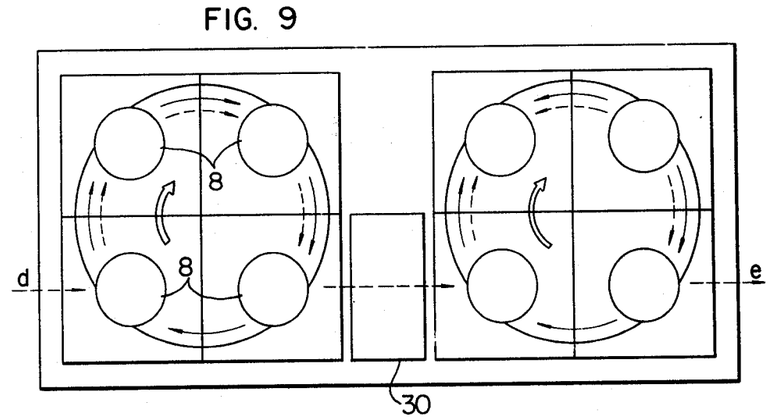

The device shown in the FIG. 8 cannot manufacture a recording medium having both surfaces provided with signal patterns. However, the device shown in FIG. 9 can produce a recording medium having both surfaces provided with signal patterns and can made on a mass production base. In this device, two similar devices, as shown in FIG. 8 are adjacently disposed so that the section D (recording medium separating section) of the left-hand device, as considered in FIG. 9, is opposite to the section A (carrier member mounting section) of the right-hand device, interspersed by a separating and turn-over device 30 which operationally engages the right-hand device with the left-hand device. Operation of the device shown in FIG. 9 will be explained. The carrier member mounted in the section A of the left-hand device along an arrow d, is formed with one transfer layer on one surface thereof and is delivered to the section D. Therefore, the separating and turn-over device 30 firstly separates the recording medium from the stamper and then turns the recording medium having only one surface transcribed with one signal pattern from the stamper, upside down, so that the other surface having no signal pattern is opposed to the stamper in the section A of the right-hand device. The carrier member is thus mounted on the stamper of the right-hand device. The center aperture of the carrier member is fitted onto the center nozzle shaft. Therefore, the carrier member is treated through the same working procedure as that made through the left-hand device so that the recording medium having both surfaces provided with the signal patterns can be taken out along an arrow e. A non-contacting type holding plate proposed by Japanese Patent Application No. 165358/79 and having static pressure air blowing means can be used, if there is a risk that the transfer layer already transcribed with a signal pattern is damaged when the carrier member is pressed by the holding plate directly contacted to the transcribed layer on the carrier member, in the section B.

Thus, by the information recording medium manufacturing device in which a radiation curable liquid resin is injected through the center nozzle shaft and one or more stampers are shifted in an efficient working manner, information recording mediums in a high quality can be manufactured on a mass production base.

Figure 10:
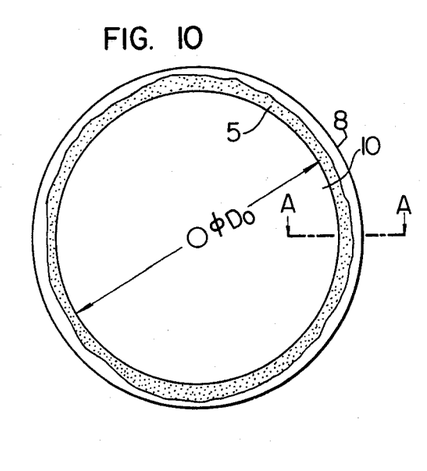
FIG. 10 is a plan view illustrating a recording medium molded by a prior art device.

When using the above mentioned devices, difficulty is encounted when the outer perihery of the transfer layer is made coincident with that of the carrier member. Therefore, it is not preferable to use a carrier member having a diameter of the same size as that of the finished recording medium having a diameter of Do. Therefore, the following measure is conventionally taken for avoiding the above-mentioned difficulty. That is, referring to FIG. 10, the amount of the liquid resin injected is so selected that the liquid resin is developed, exceeding over the periphery of the carrier member when it is pressed between the stamper and the carrier member, thereby to obtain a recording medium having a transfer layer or layers coincide with the carrier member by cutting the excess portion of the transfer layer or layers along the periphery of the carrier member. However, it spoils the aesthetic appearance of the cut surface of the recording medium to cut the projected portion of the transfer layer alone along the periphery of the carrier member 10. Further, two additional steps of beforehand shaping the carrier member into a disc having a diameter corresponding to the finished diameter Do of the recording medium and cutting the projected portion of the transfer layer, are necessary, which causes the working efficiency to be low.

Figure 11:
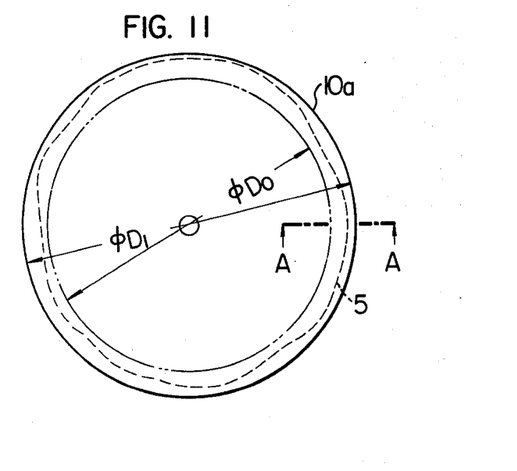
FIG. 11 is a plan view illustrating a recording medium molded by the device of the present invention.
Figure 12:
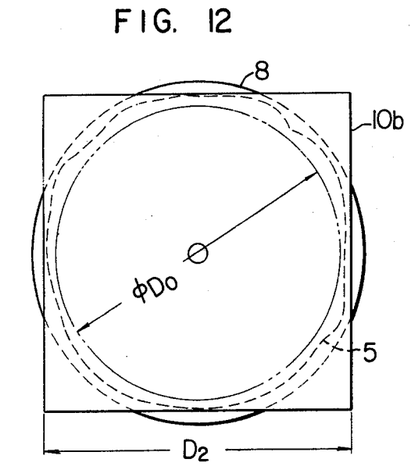
FIG. 12 is a plan view illustrating another recording medium molded by the device of the present invention.
Figure 13:
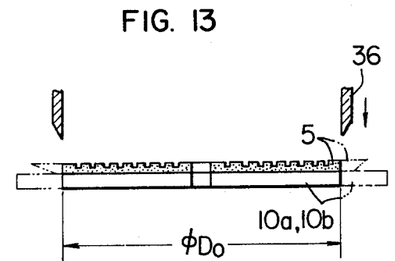
FIG. 13 is a sectional view illustrating a finishing step in one exemplified form of the present invention.
Figure 14A:
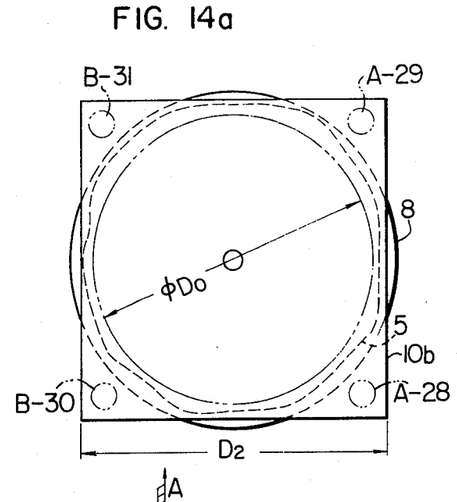
FIG. 14a is a plan view illustrating another embodiment of the present invention.
Figure 14B:
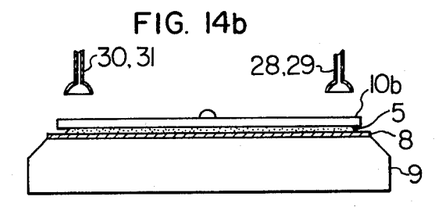
Figure 14C:
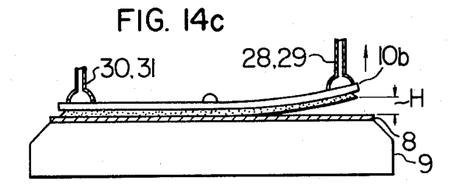
Figure 14D:
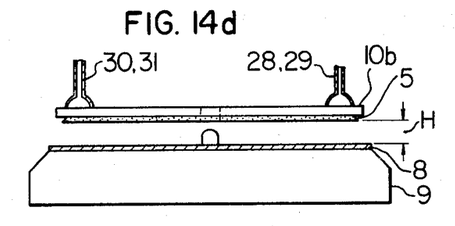

In order to eliminate the above-mentioned disadvantages, it is preferable to use a carrier member 10a having a diameter larger than Do, as shown in FIG. 11 or a carrier member 10b in the shape of a square having a side length of $D_2$ which is larger than Do as shown in FIG. 12. These carrier members 10a and 10b can eliminate the beforehand shaping step thereof, and are finally cut into a disc having the finished diameter Do simultaneously with cutting off the projected portion of the transfer layer beyond the periphery of the Do diameter disc, using a punch or lathe, as shown in FIG. 13. Due to the above-mentioned working procedure, information recording mediums having transfer resin layers each uniformly developed all over the surface of carrier member, and giving an outstanding aesthetic appearance to the cut portion of the recording mediums, are manufactured in a high working efficiency on a mass production base, and which, therefore have an enhanced value as commercial goods. The large size carrier members as shown in FIGS. 11 and 12 have a further advantage in that they can provide marginal areas utilized as gripping portions for separating the carrier member together with the transfer layer from the stamper. Referring to FIG. 14, the separation of the recording medium will be explained. As mentioned the above, the carrier member 10b originally has a square shape having a side length larger than the finished diameter Do of the recording medium. Due to the square shape, the carrier member can be easily manufactured. Vacuum absorption pads 28, 29, 30 and 31 are arranged to grip the carrier member in the portions A28, A29, B30 and B31 which are corner portions outside of the finished disc of the diameter Do, thereby to separate the recording medium from the stamper. The absorption pads 28, 39, 30 and 31 in the state as shown in FIG. 14b are lowered, and firstly grip the portions A28 and A29 by exerting vacuum force through the absorption pads 28, 29. Therefore, when the absorption pads 28, 29 are raised, the carrier member united with the transfer layer is linearly separated from the stamper, starting from the portions A28 and A29. The first step of the separation is stopped when the carrier member is raised at a height of H (10 to 20 mm). Next the absorption pads 30, 31 grip the portions B30, B31 of the carrier member by suction force, and are raised up to the same height H so that the carrier member is linearly separated in the opposite direction to that of the first separating step from the portions B30, B31. The separation of the carrier member together with transfer layer is thus completed, as shown in FIG. 14d. The linear separation as mentioned above, requires a remarkably less force than that of the conventional planar separation.

Figure 15A:
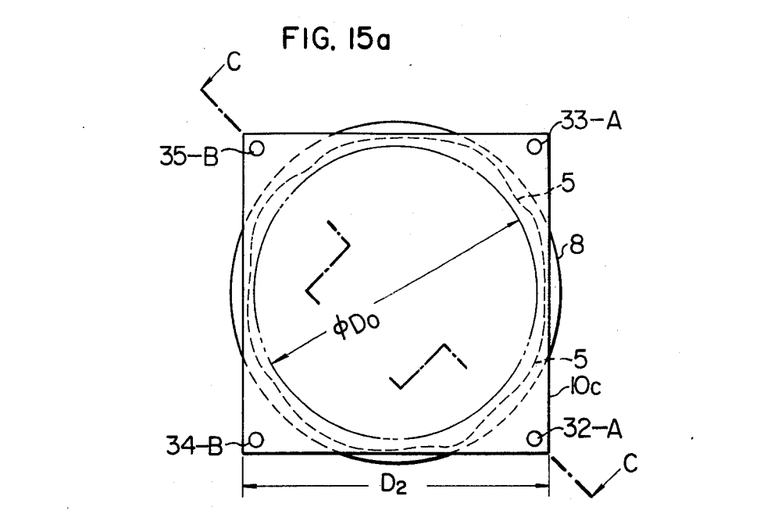
FIG. 15a is a plan view illustrating still another embodiment of the present invention.
Figure 15B:
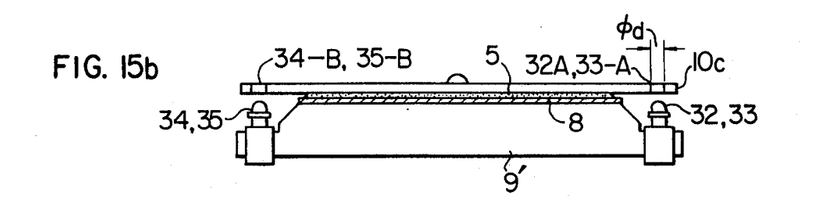
Figure 15C:
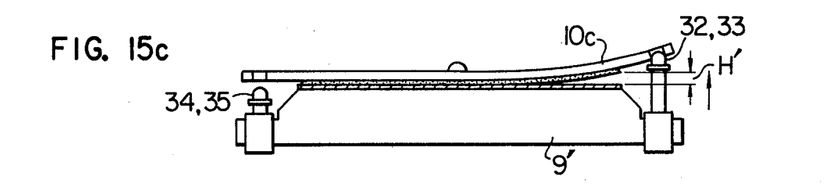
Figure 15D:
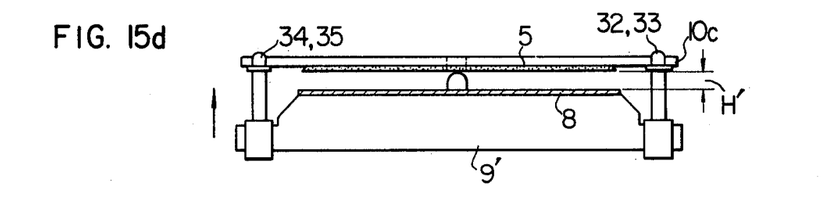

FIG. 15a shows a carrier member of a square shape having a side length $D_2$ in which four holes 32A, 33A, 34B and 35B having a diameter D mm, provided in the four corners of the carrier member, respectively. Referring to FIGS. 15b through 15d, the mold base is provided with separating pins 32, 33, 34 and 35 which are coupled with air cylinders and are arranged to be fitted into the holes 32A, 33A, 34A and 35B. The pins 32, 33 are firstly inserted into the holes 32A 33A, and then raised up to a height of H'. Therefore, the carrier member united with the transfer layer is linearly separated from the portions of the holes 32A, 33A. Next the pins 34, 35 are inserted into the holes 34B, 35B and raised upto the same heigher H' so as to separate the carrier member from the portions of the holes. The separation of the carrier member together with the transfer layer is completed as shown in FIG. 15d. Further, the holes 32A, 33A, 34B and 35B are also useful for precisely locating and setting the carrier member onto the stamper when using the automatic handling device, since the holes are also precisely positioned in the carrier member.

By cutting the information recording medium as shown in FIG. 13 into a disc shape having the finished diameter Do, information recording mediums having transfer layers each uniformly developed all over the surface of the carrier member and giving an outstanding aesthetic appearance, are manufactured, and which therefore have an enhanced value as commercial goods.

Although the invention has been described in considerable detail with respect to preferred embodiments thereof, it will be apparent that the invention is capable of numerous modifications and variations apparent to those skilled in the art without departing from the sprit and scope of the invention.

What we claim is:

1. A device for manufacturing an information recording medium made from a radiation curable layer-forming liquid resin, comprising:
    (a) a first movable base;
    (b) a first planar stamper carrying an information recording signal pattern to be transcribed, said first planar stamper being mounted on said first movable base;
    (c) first injecting means mounted in the center part of said first movable base, retractably projecting upward from and through the center of said first stamper and having an injection nozzle which is closed after injection, for injecting said liquid resin;
    (d) a first planar flexible carrier member having at least one carrying surface and adapted to be held by said first injecting means so as to define a first gap together with said first stamper, said liquid resin being injected into said first gap from said first injecting means, said first carrier member being mounted to said first injecting means when said movable base is located in a first carrier member mounting section;
    (e) first pressing means positioned in a first liquid resin injecting and pressing section, for pressing a hold member against said first carrier member so as to uniformly distribute the liquid resin injected from said first injecting means all over the surface of said first carrier member;
    (f) first irradiating means positioned in a first radiant ray irradiating section, for irradiating radiant rays to said liquid resin in said first gap so as to form at least a portion of an information recording medium;
    (g) first separating means positioned in a first carrier member separating section, for separating said first carrier member so as to remove and obtain said at least a portion of said information recording medium; and
    (h) first shifting means for shifting said first movable base together with said first stamper and first carrier member from said first carrier member mounting section, sequentially through said first liquid resin injecting and pressing section and said first radiant ray irradiating section, to said first carrier member separating section, and then returning the same to said first carrier member mounting section.

2. A device as set forth in claim 1, wherein said first carrier member mounting section and said first carrier member separating section are positioned in a common place, said first shifting means shifts said first movable base together with said first stamper from said carrier member mounting section through said first injecting and pressing section to said first radiant ray irradiating section, and returns the same to said first carrier member separating section positioned in the same place as said first carrier member mounting section.

3. A device as set forth in claim 1, wherein said first shifting means shifts said first movable base together with said first stamper from said first carrier member separating section, through said first injecting and pressing section and said first radiant ray irradiating section to said first carrier member separating section, and returns the same to said first carrier member mounting section.

4. A device as set forth in claim 3, wherein a plurality of said first stampers are carried by said first shifting means so as to be respectively positioned on said first carrier member mounting section, said first radiation curable liquid resin injection and pressing section, said first carrier member mounting section, and are syncronously shifted by said first shifting means.

5. A device as forth in claim 1, wherein said first planer flexible carrier member is in a shape having a size larger than that of a finished information recording medium obtained from said first carrier member separating section.

6. A device as set forth in claim 5, wherein said first separating means cooperates with engaging portions provided at said first carrier member, which are located out of an area corresponding to said finished information recording medium.

7. A device as set forth in claim 1, further comprising:
(a) a second movable base;
(b) a second planar stamper carrying a second information recording second signal pattern to be transcribed, said second planar stamper being mounted on said second movable base;
(c) second injecting means mounted in the center part of said second movable base, retractably projecting upward from and through the center of said second stamper and having an injection nozzle which is closed after injection, for injecting said liquid resin;
(d) a second planar flexible carrier member having at least one carrying surface and adapted to be held by said second injecting means so as to define a second gap together with said second stamper, said liquid resin being injected into said second gap from said second injecting means, said second carrier member being mounted to said second injecting means when said movable base is located in a second carrier member mounting section;
(e) second pressing means positioned in a second liquid resin injecting and pressing section, for pressing a hold member against said second carrier member so as to uniformly distribute the liquid resin injected from said second injecting means all over the surface of said second carrier member;
(f) second irradiating means positioned in a second radiant ray irradiating section, for irradiating radiant rays to said liquid resin in said second gap so as to form at least another portion of said information recording medium;
(g) second separating means positioned in a second carrier member separating section, for separating said second carrier member so as to remove and obtain said information recording medium;
(h) second shifting means for shifting said second movable base together with said second stamper and second carrier member from said second carrier member mounting section, sequentially through said second liquid resin injecting and pressing section, and said second radiant ray irradiating section, to said second carrier member separating section, and then returning the same to said second carrier member mounting section; and
(i) means for operatively coupling said first carrier member separating section with said second carrier member mounting section, said means for operatively coupling including means for removing said at least a portion of said information recording medium from said first carrier member separating section, turning it over, and placing it opposed to said second stamper so that a completed information recording medium can be produced having different signal patterns from said first and second stampers on opposite sides thereof.

* * * * *